(12) United States Patent
Schiele et al.

(10) Patent No.: US 7,798,271 B2
(45) Date of Patent: Sep. 21, 2010

(54) METHOD FOR ACTUATING A HYDRAULIC STORAGE DEVICE OF A TRANSMISSION UNIT

(75) Inventors: Peter Schiele, Kressbronn (DE); Armin Thiele, Tettnang (DE); Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 411 days.

(21) Appl. No.: 11/851,026

(22) Filed: Sep. 6, 2007

(65) Prior Publication Data

US 2008/0060862 A1 Mar. 13, 2008

(30) Foreign Application Priority Data

Sep. 7, 2006 (DE) .................. 10 2006 041 899

(51) Int. Cl.
*B60K 6/12* (2006.01)
(52) U.S. Cl. .................. 180/165; 60/413; 417/36
(58) Field of Classification Search .................. 180/165; 60/413, 414, 416, 417, 418; 417/36, 37, 417/38, 39, 40, 41
See application file for complete search history.

(56) References Cited

U.S. PATENT DOCUMENTS

| | | | |
|---|---|---|---|
| 4,278,403 A * | 7/1981 | Shafer .................. | 417/38 |
| 5,316,116 A | 5/1994 | Slicker et al. | |
| 5,794,734 A | 8/1998 | Fahl et al. | |
| 6,553,857 B2 * | 4/2003 | Sporl .................. | 74/335 |
| 6,736,099 B2 * | 5/2004 | Mori et al. .......... | 123/179.31 |

FOREIGN PATENT DOCUMENTS

| | | |
|---|---|---|
| DE | 43 23 133 A1 | 1/1994 |
| DE | 43 33 564 A1 | 4/1995 |
| DE | 693 09 004 T2 | 10/1997 |
| DE | 199 23 154 A1 | 11/1999 |
| DE | 199 61 796 C1 | 9/2001 |
| DE | 101 28 867 A1 | 12/2002 |
| DE | 10 2006 014 756.1 | 3/2006 |
| EP | 1 679 456 A1 | 1/2005 |
| GB | 2 339 606 A | 2/2000 |
| JP | 2002-106380 | 4/2002 |

\* cited by examiner

*Primary Examiner*—Paul N Dickson
*Assistant Examiner*—John D Walters
(74) *Attorney, Agent, or Firm*—Davis & Bujold, P.L.L.C.

(57) ABSTRACT

A process for actuating a hydraulic storage device (5) of a transmission unit comprising a storage space (9) whose volume can be varied between a minimum and a maximum. The volume of the storage space can be changed by acting upon the storage space with pressurized hydraulic fluid from a pressure supply (19) of the transmission unit. To overcome a restoring tendency of the hydraulic storage device, the pressure is set to a threshold value. A holding device (12) holds the hydraulic storage device at least in the operating condition that corresponds to the maximum volume of the storage space against the restoring tendency. The storage space is acted upon by the pressure supply with a pressure corresponding to a threshold value (P_threshold) until the hydraulic storage device reaches the operating condition in which it can be held by the holding device.

6 Claims, 3 Drawing Sheets

METHOD FOR ACTUATING A HYDRAULIC STORAGE DEVICE OF A TRANSMISSION UNIT

This application claims priority from German Application Serial No. 10 2006 041 899.9 filed Sep. 7, 2006.

FIELD OF THE INVENTION

The invention concerns a method for actuating a hydraulic storage device of a transmission unit.

BACKGROUND OF THE INVENTION

From DE 10 2006 014 756.1 a device for storing the hydraulic fluid of a hydraulic system of a transmission unit and a method for operating such a device are known. The device for storing hydraulic fluid is formed with at least one storage space delimited by a housing device and a delimiting device, and can be brought into active communication with a hydraulic system for the exchange of hydraulic fluid, and its volume can be varied between a minimum and a maximum as a function of the operating condition of the delimiting device and/or the housing device. The delimiting device and/or the housing device can be held by a holding device at least in the operating condition that corresponds to the maximum volume of the storage space against a restoring tendency of the housing device and/or the delimiting device starting from an operating condition which is different from the operating condition of the housing device and/or the delimiting device that corresponds to the minimum volume of the storage space, in the direction of their operating condition that corresponds to minimum volume of the storage space.

In this way a defined volume of hydraulic fluid, provided for the control of shift elements of a transmission unit, can be stored intermediately unpressurized in the storage space and, depending on the operating situation, can be introduced into the hydraulic system of the transmission unit at a defined pressure by acting upon the holding device to release the delimiting device and/or the housing device, by virtue of the restoring tendency of the housing device and/or the delimiting device. With this method for operating such a device in a vehicle with at least one hydraulically controlled structural group, the detent mechanism of the holding device is deactivated when there is a need to pass the hydraulic fluid out of the storage space and into the hydraulic system, in order to be able to actuate a shift element(s) as required by the operating situation by way of the hydraulic fluid volume stored intermediately in the storage space.

A disadvantage of this, however, is that during various operating situation changes of the hydraulic system, the delimiting device and/or the housing device cannot be converted to an operating condition in which the holding device or its detent mechanism is locked and the delimiting device and/or housing device are not held by the holding device during the current operating condition against the restoring tendency of the housing device and/or delimiting device, and the hydraulic fluid stored in the device, or its storage space, escapes uncontrolled from the storage space because of the restoring tendency.

Accordingly, the purpose of the present invention is to provide a method for actuating a hydraulic storage device by way of which the hydraulic storage device is brought to an operating condition in which the holding device is activated and the hydraulic storage device, starting from an operating condition different from that which corresponds to the minimum volume, can be held against the restoring tendency of the hydraulic storage device in the direction of an operating condition that corresponds to the minimum volume of the storage space.

SUMMARY OF THE INVENTION

In this method according to the invention for actuating a hydraulic storage device of a transmission unit, with a storage space whose volume can be varied between a minimum and a maximum, the volume of the storage space can be changed from the minimum to the maximum by acting upon the storage space with pressurized hydraulic fluid from a pressure supply of the transmission unit. The pressure is set to a threshold value to overcome a restoring tendency of the hydraulic storage device, starting from an operating condition different from that which corresponds to the minimum volume, in the direction of an operating condition that corresponds to the minimum volume of the storage space. In addition, a holding device is provided for holding the hydraulic storage device at least in the operating condition that corresponds to maximum volume of the storage space against the restoring tendency.

According to the invention, the storage space is acted upon by the pressure supply with a pressure value corresponding to the threshold value, at least until the hydraulic storage device has reached the operating condition in which it can be held by the holding device.

This means that with the method according to the invention, a filling pressure of the storage space is varied or an actuator system of a transmission unit is controlled in such a manner that filling of the storage space of the hydraulic storage is ensured until it is in an end position where it can be detained. For this, the pressure of the hydraulic storage device's pressure supply, starting from a current pressure level, can be increased or reduced in such a manner that to fill the storage space a pressure potential is available by way of which the hydraulic storage device can, in any event, be brought to an operating condition in which it can be held by the holding device, such that the filling of the storage space is preferably ensured after the lapse of a predefined time.

In an advantageous embodiment of the method according to the invention, a change of the pressure supply's pressure is carried out during a thrust operation of a vehicle drivetrain comprising the transmission unit. This pressure change of the pressure supply is designed so that it can conform with various strategies, and is preferably carried out during rolling processes of a vehicle. This is advantageous even though an increase of the pressure of the pressure supply of the hydraulic system of the transmission unit basically leads to a higher transmission pump take-up torque, since the higher transmission pump take-up torque during a thrust operation, does not result in increased fuel consumption of a combustion engine of the vehicle's drivetrain.

In an also advantageous further embodiment of the method according to the invention, the pressure of the pressure supply is not changed during a shift process in the transmission unit. In a simple manner this avoids compromising the shift processes and also ensures that the volume of hydraulic fluid required for filling the storage space of the hydraulic storage device is made available, without thereby compromising any other functions of the transmission.

In other embodiments of the method according to the invention, the pressure of the pressure supply for filling the storage space of the hydraulic storage device is only changed during an activated engine start-stop function or, in general, only in the event of an engine start-stop function related need to switch off the combustion engine. This avoids or minimizes unnecessary pressure changes of the pressure supply and thus also any undesired increase of the fuel consumption.

In addition, in another advantageous embodiment of the method according to the invention, the change of the pressure supply's pressure is limited in time or is ended when an operating condition of the hydraulic storage device is reached, in which the latter is held in the operating condition by the holding device against the restoring tendency.

In this case, after a lapse of a predefined time starting from the beginning of the change in pressure of the pressure supply, the pressure supply's pressure change is set to a pressure value that depends on the current operating condition of the transmission unit. The predetermined time can preferably be adapted or changed in a teach-in manner as a function of at least one operating condition parameter of a component of the vehicle's drivetrain, such as a transmission oil temperature, a transmission system pressure, an engine speed or a transmission pump speed, as a function of rapid-filling time adaptation values, transmission operating hours, a transmission wear indication, a currently engaged transmission ratio, or the like.

In addition, or alternatively thereto, in further advantageous embodiments of the method according to the invention, the predefined time is determined by way of a filling model that pictures the filling level of the storage space, this filling model having recourse to pressure values of the pressure supply determined by measurement techniques and to other operating condition parameters of various components of a vehicle drivetrain, and determining a current theoretical filling level of the storage space.

Furthermore, in another advantageous embodiment of the method according to the invention, the predefined time is adapted as a function of a pressure change of the pressure system brought about by at least one transmission function, so as not to compromise its functionality and if needs be to avoided unnecessary variations of the pressure supply's pressure.

BRIEF DESCRIPTION OF THE DRAWINGS

The invention will now be described, by way of example, with reference to the accompanying drawings in which.

DETAILED DESCRIPTION OF THE INVENTION

Figure 1:
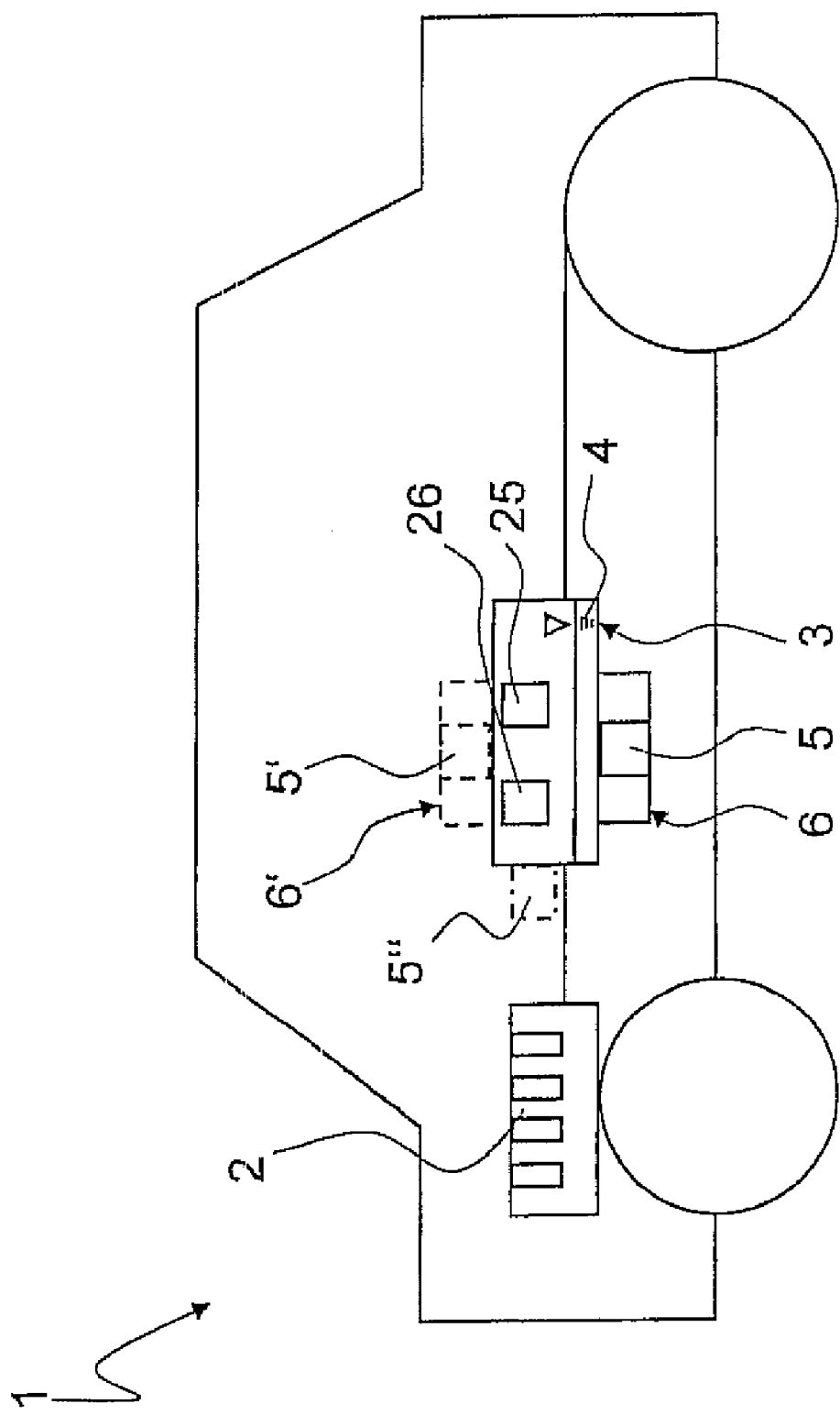
FIG. 1 is a schematic representation of a vehicle which comprises a transmission unit and a hydraulic storage device according to the invention.

FIG. 1 shows a very schematic representation of a vehicle 11, made in a known manner with a combustion engine 2 and a transmission unit 3. Basically, the transmission unit 3 can be any automated manual shift or automatic transmission known from common practice, which incorporates hydraulically controlled shift elements 25, 26, such as frictional disk clutches or disk brakes.

Figure 2:
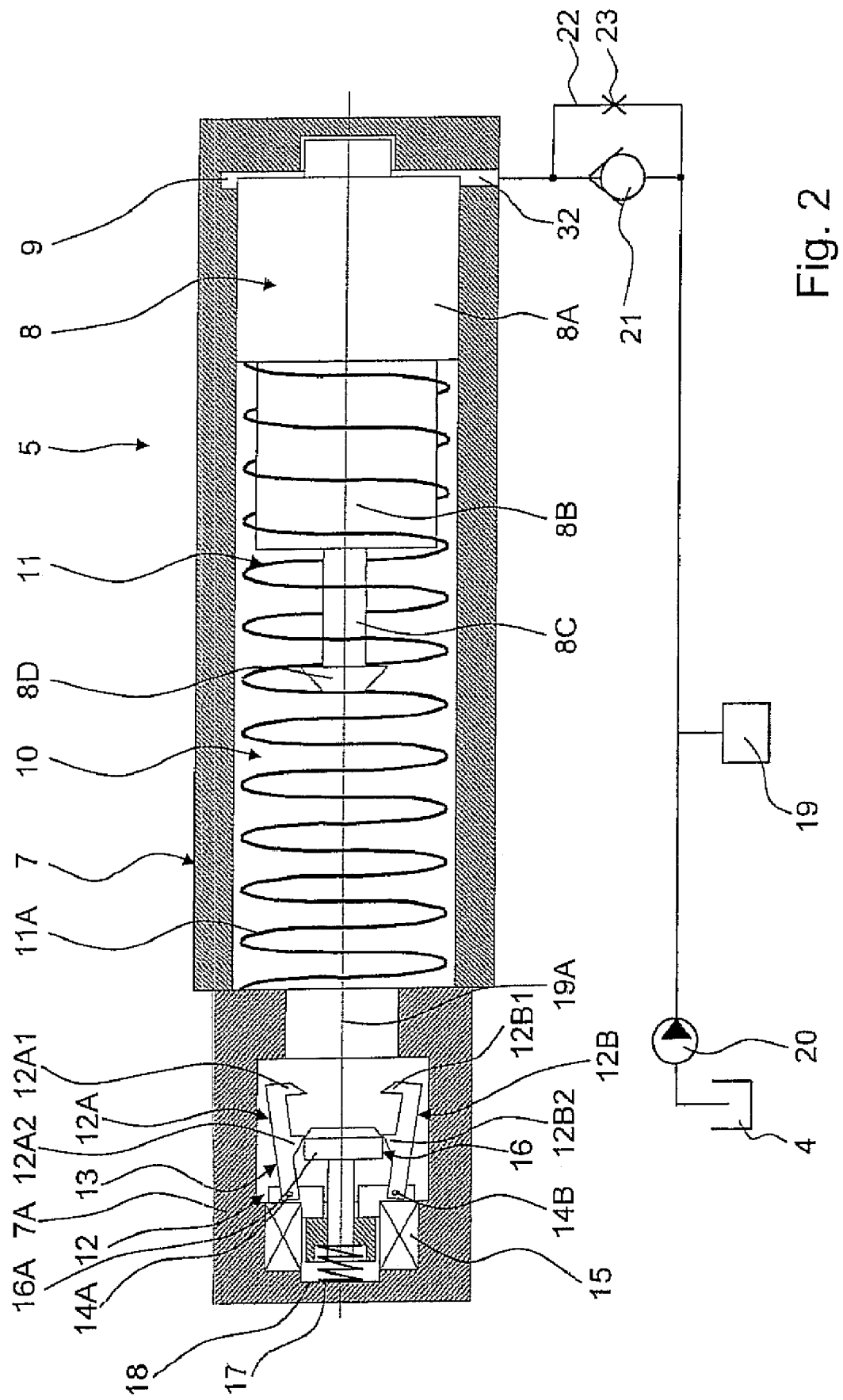
FIG. 2 is a schematic representation of the hydraulic storage device.

In the present case, the transmission unit 3 or vehicle's transmission is made with a hydraulic system 19 shown very schematically in FIG. 2, an oil sump 4 and a hydraulic storage device 5 for storing hydraulic fluid of the hydraulic system 19 of the transmission unit 3, the hydraulic storage device 5 being arranged in a hydraulic shift unit 6 of the vehicle transmission 3, as shown in FIG. 1. Alternatively, the hydraulic storage device together with the shift unit can also be arranged above the filling level of the oil sump 4, this arrangement of the hydraulic storage device and the shift unit being shown in more detail in FIG. 1 with respective indexes 5 and 6.

As a further alternative, the hydraulic storage device can also be arranged in another location outside or inside the transmission unit 3 and spatially separate from the shift unit 6, one of the last-mentioned arrangement possibilities being shown in more detail in FIG. 1 with the respective index 5.

To optimize consumption and reduce pollutant emissions by the vehicle 1, a so-called engine start-stop function is provided by way of which the combustion engine 2 is switched off, under predefined operating conditions of the vehicle 1, and re-started when one or more predefined start criteria is/are satisfied.

For example, when the brake light is on and the vehicle is at rest and/or when the driver actuates the brake pedal of the vehicle's working brake system even during very short stationary phases of the vehicle when the selector lever is in position "D" for driving forward, the combustion engine 2 is switched off, and is re-started when various start criteria are satisfied, for example, when the brake pressure falls below a threshold value, when the vehicle's brakes are released, when the brace light is off, when the driver moves the selector lever to a position in which a start of the combustion engine 2 is required, when the accelerator pedal is actuated more or less than a threshold amount, when the control system indicates a starting process of the combustion engine, when the drive output speed is higher or lower than a threshold value, when there is a predefined charge balance of an electric accumulator of the vehicle, or as a function of comfort criteria, such as a need to air-condition the passenger compartment.

The hydraulic storage device 5 associated with the transmission unit 3 is illustrated in a very schematic longitudinal section view in FIG. 2. The hydraulic storage device 5 is made with a cylinder 7 and a piston 8 arranged in the cylinder 7 and able to move longitudinally between two end positions. The cylinder 7 and piston 8 delimit a storage space 9 connected to the hydraulic system 19 of the transmission unit 3, whose volume can be varied between a minimum and maximum as a function of an operating condition of the hydraulic storage device or a position of the piston 8 in the cylinder 7. The volume of the storage space 9 gets smaller during a movement of the piston 8 toward its first end position, and larger during a movement toward its second end position. Furthermore, inside the cylinder 7, on the side of the piston 8 remote from the storage space 9, the piston 8 and the cylinder 7 delimit a space 10 in which a spring device 11 is arranged.

In this case, the spring device 11 comprises a spring element 11A in the form of a spiral spring which rests, at one end, against the end of the piston 8 remote from the storage space 9 and, at the other end, against an end face of a housing portion 7A of the cylinder, and acts as a compressing spring during operation of the hydraulic storage device 5.

In the housing portion 7A is arranged a holding device 12 by way of which the piston 8 can be detained in the position corresponding to maximum volume of the storage space 9, i.e., in the second end position of the piston 8, against a restoring tendency of the piston 8 starting from an operating condition different from that which corresponds to the minimum volume of the storage space 9, in the direction toward the operating condition of the piston 8 that corresponds to minimum volume of the storage space 9. In the example embodiment of the hydraulic storage device 5 shown in FIG. 2, the restoring tendency of the piston 8 is produced by the spring device 11 that co-operates with the piston 8 and the cylinder 7 or its housing portion 7A.

In the area of its side facing the space, the piston 8 is formed with a piston area 8B of outer diameter smaller than the guiding part 8A whose outer diameter, matches in principle the inner diameter of the cylinder 7, this in turn being connected to a bolt element 8C. In its end area facing from the piston area 8B the bolt element 8C is hat-shaped with a truncated cone area 8D, the conical surface of the truncated cone area 8D facing toward the holding device 12 and, in the manner described below, co-operating appropriately with guide ramps of several detent elements 12A, 12B of the holding device 12 during a movement of the piston 8 from its first end position in the direction of its second end position, to avoid sticking.

In this case, the outer diameter of the spring device 11A is smaller than the inner diameter of the cylinder 7, so that when the spring element 11A is compressed, there is no mutual friction between the spring element 11A and the cylinder 7. Furthermore, the inner diameter of the spring element 11A and the outer diameter of the piston area 8B of the piston 8 are matched to one another so that the outer surface of the piston area 8B forms a guiding and supporting surface for the spring element 11A, therefore definitely preventing any undesired buckling of the spring element 11A in its condition of maximum compression. This avoids any sticking between the spring element 11A and the cylinder 7 and ensures trouble-free operation of the hydraulic storage device 5.

In addition, the axial length of the piston area 8B is made such that the spring element 11A is not compressed beyond a maximum amount and plastic deformation of the spring element 11A, which would adversely affect the operating behavior of the hydraulic storage device 5, is avoided.

In the present case, the holding device 12 has a detent mechanism 13 consisting essentially of detent elements 12A and 12B which, at one end, pivot about pivot points 14A and 14B fixed to the housing and, at the other end, each have respective corresponding guide ramps 12A1 and 12B1 that co-operate with the truncated cone area 8D to prevent sticking.

In addition, the detent mechanism 13 has an actuating tappet 16 that deactivates the holding device 12 when an electromagnetic actor 15 is not energized which, in the area of its end remote from the piston 8, is spring-loaded by a further spring device 17 in the direction of a position in which the holding device 12 is deactivated, while when the electromagnetic actor 15 is in the energized condition, the tappet is pushed, against the spring force of the other spring device 17, with its end remote from the piston 8 against an abutment area 18 of the housing portion 7A. In the last-mentioned position of the actuating tappet 16, its head area 16A is moved out of an active zone in which the actuating tappet 16, with its head area 16A, co-operates with other guide ramps 12A2 and 12B2 of the detent elements 12A, 12B and swivels the detent elements 12A, 12B, as shown in FIG. 2, radially outward around the pivot points 14A and 14B relative to a rotation axis 19A of the hydraulic storage device 5, so that there is no overlap between the detent elements 12A and 12B and the truncated cone area 8D.

The energized condition of the electromagnetic actor 15 and the activated condition of the holding device 12 are not shown in greater detail in the drawing, so the detent elements 12A and 12B in the second end position of the piston 8 are located behind the truncated cone area 89. When the piston 8 moves toward its first end position, the detent elements 12A and 12B come in contact with the end face on the back of the truncated cone area 8D facing away from the actuating tappet 16, therefore holding the piston 8 in an operating condition that corresponds to the maximum volume of the storage space 9 against the restoring tendency of the piston 8 or spring element 11 in its second end position.

In this case, the storage space 9 is connected both to the hydraulic system 19 of the transmission unit 3 and to a transmission pump 20 of the transmission unit 3 and, in the present case, a one-way valve 21 which blocks in the filling direction of the storage space 9 is optionally fitted between the storage space 9 and the hydraulic system 19 or the transmission pump 20, and a bypass line 22, that bypasses the one-way value 21, is provided, which incorporates a throttle device 23.

Starting from the situation of the hydraulic storage device 5 shown in FIG. 2, in which the piston 8 is in its first end position which represents an operating condition of the hydraulic storage device 5 that corresponds to minimum volume of the storage space 9, when the transmission pump 20 delivers a corresponding volume, the hydraulic storage device 5 or its storage space 9 is filled against the spring force of the spring device 11 via the bypass line 22 and the throttle device 23, so that the piston 8, in its second end position, is in contact with the housing portion 7A in the area of an end face of the piston area 8B facing the holding device 12. In this position of the piston, the surfaces of the detent elements 12A and 12B and of the truncated cone area 8D facing one another are a spaced apart, since the length of the bolt element 8C is larger than needed for the actuation of the holding device 12 in order to reduce manufacturing tolerances that have to be allowed for during production of the individual components of the hydraulic storage device 5, and ensure activation of the holding device is guaranteed.

If the hydraulic pressure in the storage space 9 falls because of its activated engine start-stop function, when the combustion engine 2 is switched off and the transmission pump 20 is no longer delivering, then when the pressure falls below a certain value, the piston 8 is pushed by the spring device 11 toward its first end position until the surfaces of the truncated cone area 8D and the detent elements 12A and 12B facing one another come in contact.

By virtue of the one-way valve 21 and the throttle device 23 in the bypass line 22, in a simple way, it is made possible in a simple way to supply the hydraulic storage device 5 in a damped manner from the delivering transmission pump 20 via a hydraulic line of the hydraulic system 19 of the transmission unit 3 that delivers a system pressure, which can, for example, be 15 bar or even higher. Consequently the components of the hydraulic storage device 5 can be designed only for a filling pressure that can be adjusted via the throttle device 23 and is correspondingly low.

An additional effect of the throttle device 23 is that during the filling of the hydraulic storage device 5, since the movement of the piston 8 is delayed by the throttle device 23, the system pressure of the hydraulic system 19 does not change during the filling of the hydraulic storage device 5 to an extent that has any adverse effect on the function of the transmission unit 3.

If the storage space 9 is completely filled and the combustion engine 2 is switched off by the engine start-stop function, the piston 8 is held by the holding device 12 at least approximately in its second end position. The filling pressure built up in the storage space 9, during the filling process of the storage space 9 falls via the one-way valve 21 along with a corresponding positive pressure fall between the storage space 9 and the hydraulic system 19, and the hydraulic fluid volume stored in the storage space 9 is held there essentially unpressurized. Accordingly, elaborate sealing measures for the storage space 9 are avoided in a simple and inexpensive manner.

However, to avoid emptying of the storage space 9 when the combustion engine 2 is switched off and the transmission pump 20 is therefore not delivering, the hydraulic storage device 5 should simply be arranged below the filling level of the oil sump 4 of the transmission unit 3 since the storage space 9 will then remain completely full, without further design measures, because of the hydrostatic pressure.

If a control system calls for the combustion engine 2 to be started, the current energizing the electromagnetic actor 15 is cut off and the actuating tappet 16 is pushed by the further spring device 17 to its position where it deactivates the holding device 12 in which the detent elements 12A and 12B move out of engagement with the truncated cone area 8D of the piston 8. At the same time, the piston 8 is pushed by the spring device 11 toward its first end position and the hydraulic fluid stored in the storage space 9 passes through the open one-way valve 21, which now has a considerably larger flow cross-section than the throttle device 23, in the direction of the hydraulic system 19 where it with assists the actuation of shift elements, such as shift clutches or shift brakes 25 and 26 of the transmission unit 3.

As an alternative to the direct connection of the hydraulic storage device 5 to a line of the hydraulic system 19 of the transmission unit 3 that carries a system pressure, the storage space 9 can also be filled from another pressure supply, such as a line carrying a reduced pressure of the hydraulic system 19, preferably corresponding to 5 to 5.5 bar, or one carrying a secondary system pressure.

Figure 3:
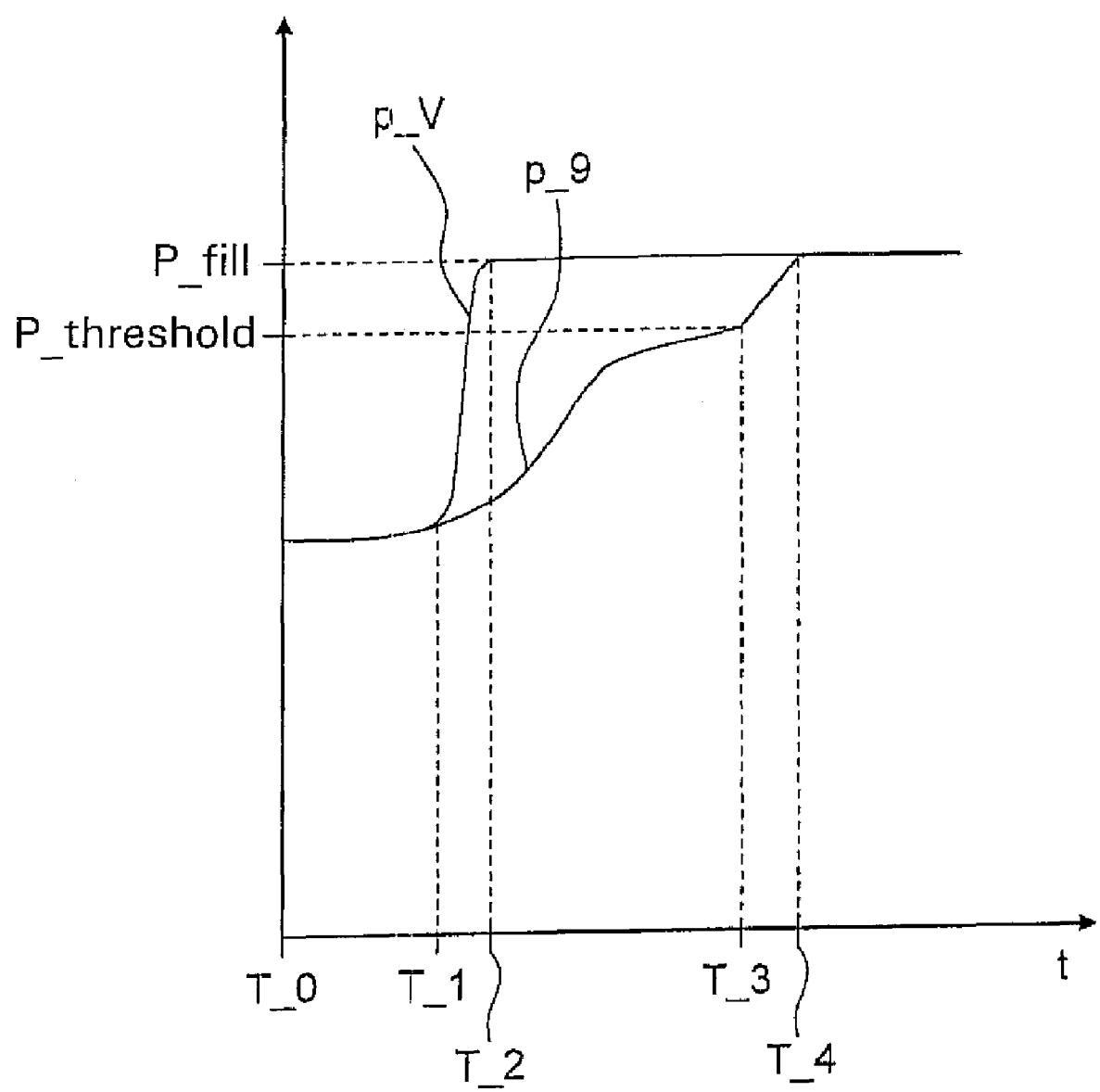
FIG. 3 is a time variation of the pressure of the pressure supply and variation of the pressure in the storage space of the device according to FIG. 1.

FIG. 3 shows a diagram in which a variation of a pressure p_V of a pressure supply of the hydraulic system 19 of the transmission unit 3 and a variation of the pressure p_9 in the storage space 9 of the hydraulic storage device 5 during a filling process of the hydraulic storage device 5 and the storage space 9 respectively, are shown as functions of time t. In this, at a time T_0, the storage space 9 is filled to a point where the piston 8 is between its two end positions and is not yet held by the holding device 12 against the restoring force exerted by the spring device 11 toward its first end position.

This results from the fact that the pressure p_V of the pressure supply of the hydraulic system 19 is lower than a threshold value P_threshold. The pressure value P_threshold corresponds to a value required to overcome the restoring tendency of the hydraulic storage device from an operating situation different from that which corresponds to the minimum volume of the storage space 9, toward the operating condition that corresponds to the minimum volume of the storage space 9, and which pushes the piston 8 to its second end position in which the piston 8 is held by the holding device 12 against the spring force of the spring device 11. When a pressure of the pressure supply of the hydraulic system 19 is applied, which corresponds at least to the pressure value P_threshold, the storage space 9 is filled over a predefined period of time so that the piston 8 is certain to be pushed from its first end position to its second end position in which the piston 8 is held by the holding device 12.

To be sure of moving the piston 8 to its second end position when there is pressure from the pressure supply of the hydraulic system 19, in the manner shown in FIG. 3, the pressure p_V of the pressure supply is increased between a time T_1 and a time T_2 up to a pressure value P_fill and, in the present case, kept constant at that value. This increase of the pressure p_V of the pressure supply of the hydraulic system 19 brings about an increase of the pressure p_9 in the storage space 9 and a consequent displacement of the piston 8 toward its second end position so that, at a time T_3, the pressure p_9 in the storage space 9 reaches the threshold value P_threshold and then, over a time period that lasts until time T_4, increases to the P_fill level of the pressure p_V of the pressure supply. In turn, this results from the fact that at time T_3, the piston 8 has reached its second end position and the storage space 9 is completely full. The piston 8 then activates the holding device 12, as described earlier, and is held by it in its second end position.

By virtue of the process described above, complete filling of the hydraulic storage device 5 or its storage space 9 is also ensured when, on account of other transmission functions, the pressure p_V of the pressure supply is at first lower than the threshold value P_threshold, so the aforesaid pressure increase is preferably carried out when it will not compromise any other transmission function(s).

Moreover, the filling pressure increase of the hydraulic storage device 5 can take place strategically and is, therefore, preferably carried out during so-called engine thrust phases, such as when a vehicle is coasting. In addition, the pressure increase does not take place during shifts in the transmission unit 3 or during so-called rapid-filling phases of shift elements of the transmission, whereby it is ensured in a simple manner that a hydraulic fluid volume required for filing the hydraulic storage device 5 is available during the filling of the storage space 9.

Besides, the pressure can also be increased, for example, in position N or position P, so that immediately after a fresh engine start, the storage device is filled as quickly as possible and is, therefore, made ready for subsequent start/stop processes.

To avoid or minimize unnecessary pressure increases and thus a possible fuel consumption increase of the vehicle 1 built with the transmission unit 3 and the hydraulic storage device 5, the pressure p_V of the pressure supply of the hydraulic system 19 is only increased to detain the piston 8 during the activated engine start-stop function and preferably only when the combustion engine 2 has to be switched off. In the present case, the pressure p_V of the pressure supply of the hydraulic system 19 is varied in the event of a call to switch off the combustion engine relating to a start-stop function in such a manner that, at the latest when the engine 2 is switched off, the hydraulic storage device 5 is held by the holding device 12 in the operating condition that corresponds at least approximately to the maximum volume of the storage space 9.

In the event of a fault in the hydraulic storage device 5 during which the piston 8 cannot be held by the holding device 12 in its second end position, to avoid increasing the pressure p_V of the pressure supply for an undesirably long time the pressure is only increased for a predefined period, and this predefined period can be adapted as a function of current operating condition parameters of the components of the drivetrain of the vehicle 1.

Finally, the pressure elevation phase can be ended on detection that the piston 8 in its second end position and/or that the holding device 12 has been activated, this position recognition of the piston 8 being carried out by supplementary sensor means of the hydraulic storage device 5.

As an alternative to determining the filling level of the storage space 9 by way of supplementary sensors of the hydraulic storage device 5, this can also be determined from a filling model which determines the filling level theoretically with reference to the applied pressure p_V of the pressure supply of the hydraulic system 19 and a filling time, and terminates the pressure elevation when the storage space 9 is recognized to be completely full. For this, the pressure p_V can, for example, be measured by a pressure sensor, but it can also be determined from the actuating current of the electrohydraulic pressure regulation valve used to control the pressure p_V.

In addition, the predefined time period can be adapted with reference to or by taking account of increases of the pressure p_V of the pressure supply of the hydraulic system 19 brought about by other transmission functions, such as a load-dependent pressure change or a pressure change caused by the filling of a shift element. In this way, the predefined period for the elevation of the pressure p_V of the pressure supply, for filling the storage device, can be made shorter, if an increase of the pressure supply's pressure has already taken place because of other transmission functions. This means that for corresponding operating condition variations of the hydraulic system 19, the predefined time period can sometimes even be set to zero, for example, if the storage space 9 is already completely full because of a load-dependent increase of the pressure supply's pressure.

Thus, in a simple way, it is made possible to follow up a pressure increase resulting from other transmission functions, flexibly, with an increase of the pressure p_V of the pressure supply required for the complete filling of the storage space 9 of the hydraulic storage device 5, such that the pressure increase required in order to bring the hydraulic storage device 5 to an operating condition that corresponds to the maximum volume of the storage space 9 is carried out primarily during the adaptable predefined time period.

Once the pressure p_V of the pressure supply of the hydraulic system 19 has been increased, the pressure p_V is brought back down to a value that depends on a current operating condition of the transmission unit so that the transmission function, to be effected with the pressure from the pressure supply, will be available as desired.

As a procedure different from that described above, however, it is also possible to reduce a pressure of the pressure supply of the hydraulic system 19, starting from a pressure level considerably higher than the threshold value P_threshold, down toward the threshold value P_threshold, in order to fill the storage space 9 completely and to detain the piston by way of the holding device 12, before the pressure of the pressure supply is reduced by a transmission control device, as required, to a value lower than the threshold value P_threshold. In this case, however, it should be borne in mind that by this procedure other transmission functions cannot be influenced, or only so to a small extent.

REFERENCE NUMERALS 1 vehicle
2 combustion engine
3 transmission unit
4 oil sump
5 hydraulic storage device
6 hydraulic shift unit
7 cylinder
7A housing portion
8 piston
8A guiding area
8B piston area
8C bolt element
8D truncated cone area
8E piston section
9 storage space
10 space
11 spring device
11A spring element
12 holding device
12A, 12B detent elements
12A1, 12B1 guide ramps
12A2, 12B2 other guide ramps
13 detent mechanism
14A, 14B pivot points
15 electromagnetic actor
16 actuating tappet
16A head area of the actuating tappet
17 other spring device
18 butment area
19 hydraulic system
19A rotation axis
20 transmission pump
21 one-way valve
23 throttle device
25 shift element
26 shift element
P_fill filling pressure
P_threshold threshold pressure
p_V pressure of the pressure supply
p_9 pressure of the storage space
T_0 specific time point
T_1 specific time point
T_2 specific time point
T_3 specific time point
T_4 specific time point
t time

The invention claimed is:

1. A method of actuating a hydraulic storage device (5) of a hydraulic system (19) of a transmission unit (3) of a vehicle (1) in which the hydraulic system (19) includes a transmission pump (20) driven by an engine (2) and connected to the hydraulic storage device (5) and the transmission unit (3), and the hydraulic storage device (5) includes a cylinder (7) and a piston (8) which is longitudinally movable within the cylinder (7), between a first position and a second position, for varying a volume of a storage space (9) defined by the piston (8) and the cylinder (7), the method comprising the steps of:

connecting the storage space (9) to the hydraulic system (19), arranging the piston (8) within the storage space (9) such that the storage space (9) has a minimum volume, when the piston (8) is in the first position, and has a maximum volume, when the piston (8) is in the second position, locating a spring device (11) within the cylinder (7), on a side of the piston (8) opposite from the storage space (9), so as to exert a resilient bias force on the piston (8) toward the first position, supplying a storage space pressure (p_V), supplied by the pressure supply (19), to the storage space (9) such that the piston (8) being movable toward the second position, against the resilient bias force exerted by the spring device (11), to increase the volume of the storage space (9) when the storage space pressure (p_V), supplied by the pressure supply (19), is at least equal to a threshold pressure value (P_threshold) on the piston (8) that exceeds the resilient bias force, and the piston (8) being movable toward the first position, by the resilient bias force, to decrease the volume of the storage space (9), when the storage space pressure (p_V) is less than the threshold pressure value (P_threshold), providing a holding device (12) for retaining the piston (8) in the second position, once the storage space pressure (p_V) moves the piston (8) to the second position, varying the storage space pressure (p_V), supplied by the pressure supply (19), as a function of a strategy so that a pressure potential is generated within the storage space (9) for filling the hydraulic storage device (5) and changing the position of the piston (8) toward the second position where the piston (8) can be held by the holding device (12), when the engine (2) is switched off and when the piston (8) is in the second position, actuating the holding device (12) to retain the piston (8) in the second position, when the engine (2) is started, releasing the holding device (12), and when the engine (2) is operating, allowing an increase in the storage space pressure (p_V), supplied by the pressure supply (19), only upon an engine thrust phase when the vehicle (1) is in motion, and preventing an increase in the storage space pressure (p_V) supplied by the pressure supply (19) during at least one of:

a shift operation in the transmission unit (3), and a rapid-filling phase of operation of the transmission unit (3).

2. The method according to claim 1, further comprising the step of, when the switching off of the combustion engine (2) is called for by an engine start-stop function, varying the storage space pressure (p_V) of the pressure supply (19) in such a manner that the hydraulic storage device (5) is held, by the holding device (12), in its operating condition at least approximately corresponding to the maximum volume of the storage space (9) at least by a time when the combustion engine (2) is switched off.

3. The method according to claim 1, further comprising the step of carrying out the change in the storage space pressure (p_V) of the pressure supply (19) after a lapse of a predefined time period starting from the beginning of the change, to a pressure value set as a function of a current operating condition of the transmission unit (3).

4. The method according to claim 3, further comprising the step of adapting the predefined time period as a function of at least one operating condition parameter of a component of the drivetrain of the vehicle (1).

5. The method according to claim 3, further comprising the step of adapting the predefined time period as a function of a change of the storage space pressure (p_V) of the pressure supply (19) brought about by at least one transmission function.

6. The method according to claim 1, further comprising the step of, upon transition of the holding device (12) from a condition in which the hydraulic storage device (5) is released to a condition in which the hydraulic storage device (5) is held, adjusting the storage space pressure (p_V) of the pressure supply (19) to a value that depends on a current operating condition.

* * * * *